US012574086B2

(12) United States Patent
Shen

(10) Patent No.: US 12,574,086 B2
(45) Date of Patent: Mar. 10, 2026

(54) CHANNEL STATE INFORMATION PROCESSING METHODS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Jia Shen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 463 days.

(21) Appl. No.: 17/564,921

(22) Filed: Dec. 29, 2021

(65) Prior Publication Data

US 2022/0123808 A1 Apr. 21, 2022

Related U.S. Application Data

(63) Continuation of application No. PCT/CN2019/102637, filed on Aug. 26, 2019.

(51) Int. Cl.
*H04B 7/06* (2006.01)

(52) U.S. Cl.
CPC ......... *H04B 7/0626* (2013.01); *H04B 7/0639* (2013.01); *H04B 7/0658* (2013.01)

(58) Field of Classification Search
None
See application file for complete search history.

(56) References Cited

U.S. PATENT DOCUMENTS

2012/0040622 A1* 2/2012 Ren ........................ H04W 24/10
455/67.11
2012/0320774 A1* 12/2012 Dai ...................... H04B 7/0621
370/252
2015/0215018 A1* 7/2015 Xiong .................. H04B 7/0626
370/329

(Continued)

FOREIGN PATENT DOCUMENTS

CN 103209057 A 7/2013
CN 109150267 A 1/2019

(Continued)

OTHER PUBLICATIONS

Machine translation of WO2018/127038 (Year: 2018).*

(Continued)

*Primary Examiner* — Faruk Hamza
*Assistant Examiner* — Cassandra L Decker
(74) *Attorney, Agent, or Firm* — Young Basile Hanlon & MacFarlane, P.C.

(57) ABSTRACT
Disclosed by the present disclosure is a channel state information processing method, including: a terminal device determines a first parameter and/or a channel state indication information type; and on the basis of the first parameter and/or the channel state indication information type, the terminal device generates channel state indication information, the channel state indication information being used by the terminal device to indicate channel state information to a network device. Further disclosed in the present disclosure are another channel state information processing method, an electronic device, and a storage medium.

12 Claims, 5 Drawing Sheets

(56)                    References Cited

U.S. PATENT DOCUMENTS

| | | | |
|---|---|---|---|
| 2015/0280801 A1 | 10/2015 | Xin et al. | |
| 2018/0091992 A1* | 3/2018 | Frenne | H04B 7/0626 |
| 2018/0322388 A1* | 11/2018 | O'Shea | G06N 3/045 |
| 2018/0367192 A1* | 12/2018 | O'Shea | H04B 7/0452 |
| 2019/0074953 A1* | 3/2019 | Tooher | H04L 5/0035 |
| 2019/0165846 A1* | 5/2019 | Kim | H04L 1/0026 |
| 2019/0362237 A1* | 11/2019 | Choi | G06N 3/044 |
| 2019/0386771 A1* | 12/2019 | Liu | H04B 7/0456 |
| 2021/0218483 A1* | 7/2021 | Fang | H04L 1/0026 |
| 2021/0351885 A1* | 11/2021 | Chavva | G06N 3/08 |
| 2022/0167305 A1* | 5/2022 | Yang | H04L 25/03006 |

FOREIGN PATENT DOCUMENTS

| | | |
|---|---|---|
| CN | 109428641 A | 3/2019 |
| EP | 3442183 A1 | 2/2019 |
| WO | 2017196252 A1 | 11/2017 |
| WO | 2018127038 A1 | 7/2018 |
| WO | 2018129733 A1 | 7/2018 |

OTHER PUBLICATIONS

Extended European Search Report for EP Application 19942736.0 mailed Jul. 4, 2022. (6 pages).
International Search Report with English Translation for PCT Application PCT/CN2019/102637 mailed May 28, 2020. (4 pages).
European Examination Report for EP Application 19942736.0 mailed Feb. 1, 2024, 4 pages.

* cited by examiner

Input layer          Hidden layer          Output layer

Input layer     Hidden layer     Hidden layer     Hidden layer     Output layer

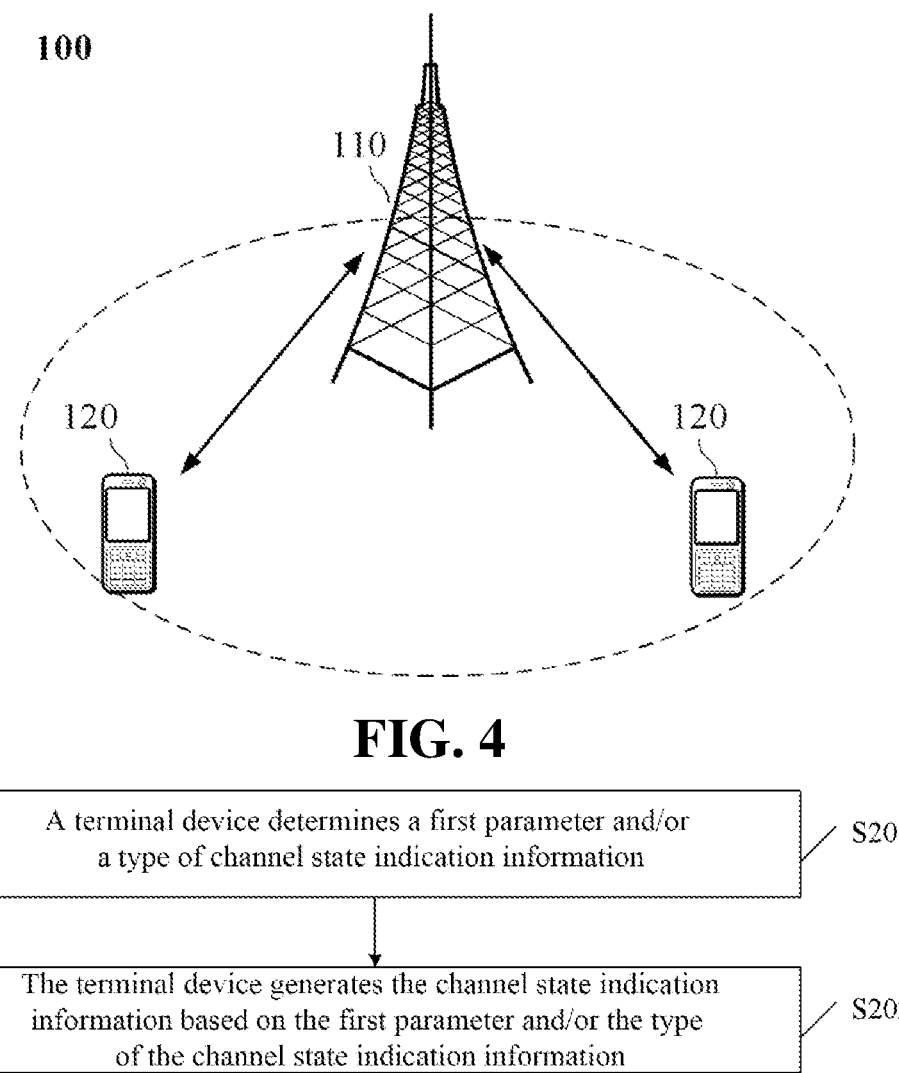

FIG. 4

| A terminal device determines a first parameter and/or a type of channel state indication information | S201 |

| The terminal device generates the channel state indication information based on the first parameter and/or the type of the channel state indication information | S202 |

FIG. 5

| First indication information | Type N of channel state indication information |
|---|---|
| M1 ( 00 ) | N1 (length of 256 bits) |
| M2 ( 01 ) | N2 ( length of 128 bits) |
| M3 ( 10 ) | N3 (length of 64 bits) |
| M4 ( 11 ) | N4 (length of 32 bits) |

FIG. 6

| First indication information | Type N of channel state indication information |
|---|---|
| M1 (00) | N1 (L=16) |
| M2 (01) | N2 (L=12) |
| M3 (10) | N3 (L=8) |
| M4 (11) | N4 (L=4) |

FIG. 7

| First indication information | Type N of channel state indication information |
|---|---|
| M1 (00) | N1 (L=32, R=16) |
| M2 (01) | N2 (L=16, R=8) |
| M3 (10) | N3 (L=8, R=4) |
| M4 (11) | N4 (L=4, R=2) |

FIG. 8

| First indication information | Type N of channel state indication information |
|---|---|
| M1 (00) | N1 (first set of first parameters) |
| M2 (01) | N2 (second set of first parameters) |
| M3 (10) | N3 (third set of first parameters) |
| M4 (11) | N4 (fourth set of first parameters) |

FIG. 9

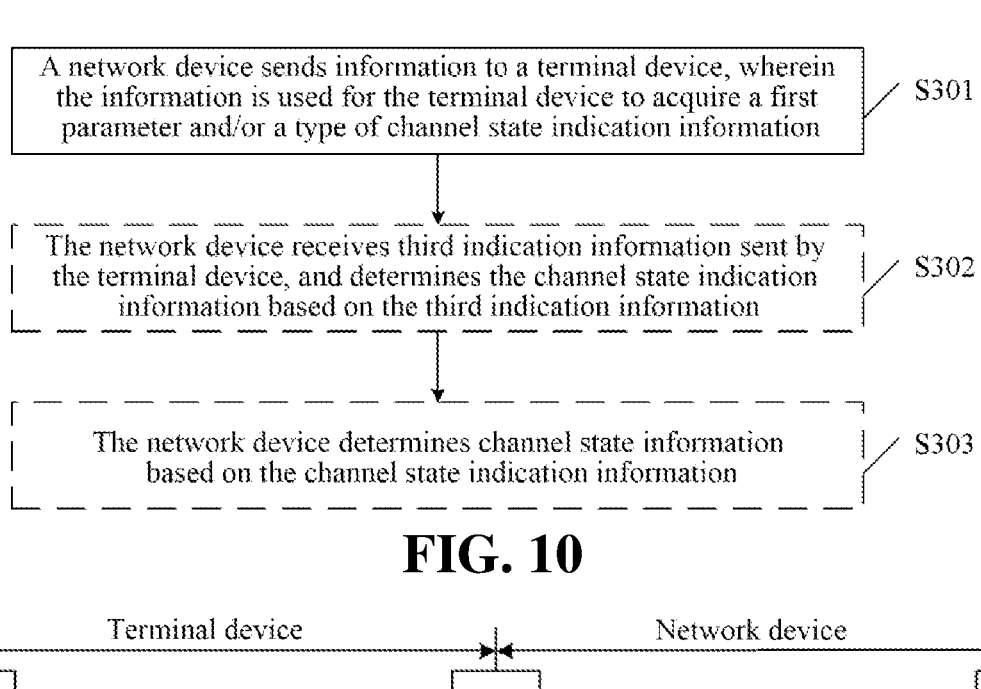

A network device sends information to a terminal device, wherein the information is used for the terminal device to acquire a first parameter and/or a type of channel state indication information / S301

The network device receives third indication information sent by the terminal device, and determines the channel state indication information based on the third indication information / S302

The network device determines channel state information based on the channel state indication information / S303

FIG. 10

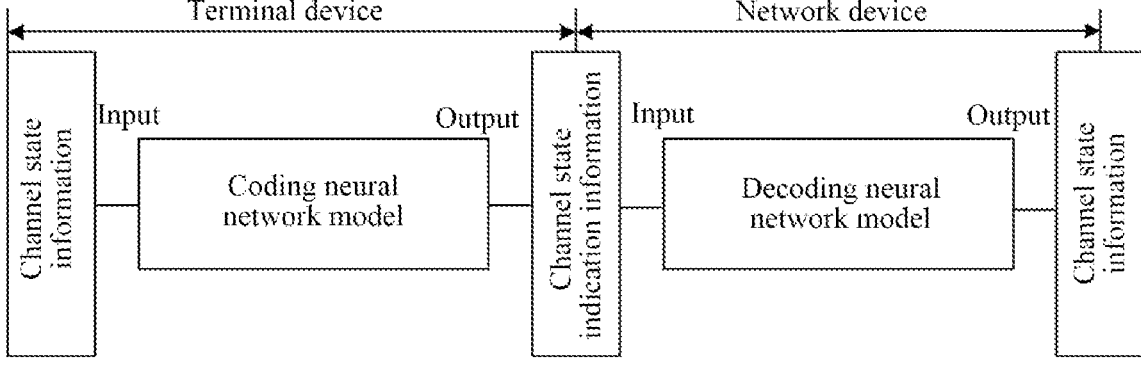

Terminal device          Network device

Channel state information | Input | Coding neural network model | Output | Channel state indication information | Input | Decoding neural network model | Output | Channel state information

FIG. 11

Network device

Configure a CSI reference signal

CSI measurement

Feed back the CSI indication information generated based on AI algorithm

Restore CSI information based on AI algorithm

Configure a data transmission mode based on CSI

Terminal device

Generate CSI indication information based on AI algorithm

FIG. 12

CHANNEL STATE INFORMATION PROCESSING METHODS, ELECTRONIC DEVICE, AND STORAGE MEDIUM

CROSS-REFERENCE TO RELATED APPLICATION(S)

The present application is a continuation application of International PCT Application No. PCT/CN2019/102637, filed on Aug. 26, 2019, the entire content of which is hereby incorporated by reference.

TECHNICAL FIELD

The present disclosure relates to the field of wireless communication technology, in particular to a method for processing channel state information, an electronic device, and a storage medium.

BACKGROUND

For Channel State Information (CSI) sent by a terminal device (User Equipment, UE) to a network device, there is no effective solution about which type of CSI the terminal device generates and how to make the network device restore the CSI accurately through CSI indication information.

SUMMARY

To solve the above technical problems, implementations of the present disclosure provide a method for processing channel state information, an electronic device, and a storage medium, which can make a network device know a type of channel state information, and accurately recover the channel state information.

In a first aspect, an implementation of the present disclosure provides a method for processing channel state information, which includes: determining, by a terminal device, a first parameter and/or a type of channel state indication information; and generating, by the terminal device, the channel state indication information based on the first parameter and/or the type of the channel state indication information, wherein the channel state indication information is used for the terminal device to indicate channel state information to a network device.

In a second aspect, an implementation of the present disclosure provides a method for processing channel state information, which includes: sending, by a network device, information to a terminal device; the information is used for the terminal device to acquire a first parameter and/or a type of channel state indication information, wherein the first parameter and/or the type of the channel state indication information is used for the terminal device to generate the channel state indication information.

In a third aspect, an implementation of the present disclosure provides a terminal device, which includes: a first processing unit, configured to determine a first parameter and/or a type of channel state indication information; and a second processing unit, configured to generate the channel state indication information based on the first parameter and/or the type of the channel state indication information, wherein the channel state indication information is used for the terminal device to indicate channel state information to a network device.

In a fourth aspect, an implementation of the present disclosure provides a network device, which includes: a second sending unit, configured to send information to a terminal device; the information is used for the terminal device to acquire a first parameter and/or a type of channel state indication information, wherein the first parameter and/or the type of the channel state indication information is used for the terminal device to generate the channel state indication information.

In a fifth aspect, an implementation of the present disclosure provides a terminal device, including: a processor and a memory configured to store a computer program capable of being run on the processor, wherein the processor is configured to execute acts of the above method for processing channel state information performed by a terminal device, when the computer program is run.

In a sixth aspect, an implementation of the present disclosure provides a network device, including: a processor and a memory configured to store a computer program capable of being run on the processor, wherein the processor is configured to execute acts of the above method for processing channel state information performed by a network device, when the computer program is run.

In a seventh aspect, an implementation of the present disclosure provides a storage medium, storing an executable program, wherein, when the executable program is executed by a processor, the above method for processing channel state information performed by a terminal device is implemented.

In an eighth aspect, an implementation of the present disclosure provides a storage medium, storing an executable program, wherein, when the executable program is executed by a processor, the above method for processing channel state information performed by a network device is implemented.

The method for processing channel state information provided by an implementation of the present disclosure includes: determining, by a terminal device, a first parameter and/or a type of channel state indication information; and generating, by the terminal device, channel state indication information based on the first parameter and/or the type of the channel state indication information, wherein the channel state indication information is used for the terminal device to indicate channel state information to a network device. The network device sends the type of the channel state indication information to the terminal device, so that the terminal device can know the type of the channel state indication information, and generate the channel state indication information corresponding to the type of the channel state indication information. The network device decodes the channel state indication information to obtain the channel state information, based on a parameter corresponding to the first parameter used by the terminal device to generate the channel state indication information and the type of the channel state indication information sent by the network device to the terminal device, and an error with the channel state information determined by the terminal device is extremely small, which improves accuracy of recovering the channel state information by the network device.

BRIEF DESCRIPTION OF DRAWINGS

FIG. 4 is a schematic diagram of a composition structure of a communication system according to an implementation of the present disclosure.

FIG. 5 is a schematic diagram of a processing flow of a method for processing channel state information applied to a terminal device according to an implementation of the present disclosure.

FIG. 6 is a schematic diagram of a first correspondence relationship according to an implementation of the present disclosure.

FIG. 7 is another schematic diagram of a first correspondence relationship according to an implementation of the present disclosure.

FIG. 8 is yet another schematic diagram of a first correspondence relationship according to an implementation of the present disclosure.

FIG. 9 is an optional schematic diagram of a second correspondence relationship according to an implementation of the present disclosure.

FIG. 10 is a schematic diagram of a processing flow of a method for processing channel state information applied to a network device according to an implementation of the present disclosure.

FIG. 11 is a schematic diagram of a network architecture for a method for processing channel state information according to an implementation of the present disclosure.

FIG. 12 is a schematic diagram of a processing flow of a method for processing channel state information applied to a communication system according to an implementation of the present disclosure.

DETAILED DESCRIPTION

In order to understand features and technical contents of implementations of the present disclosure in more detail, realizations of the implementations of the present disclosure will be described in detail below in combination with accompanying drawings, which are for reference and description only, and are not intended to limit the implementations of the present disclosure.

Before illustrating a method for processing channel state information provided by an implementation of the present disclosure in detail, CSI will be briefly described first.

Figure 1:
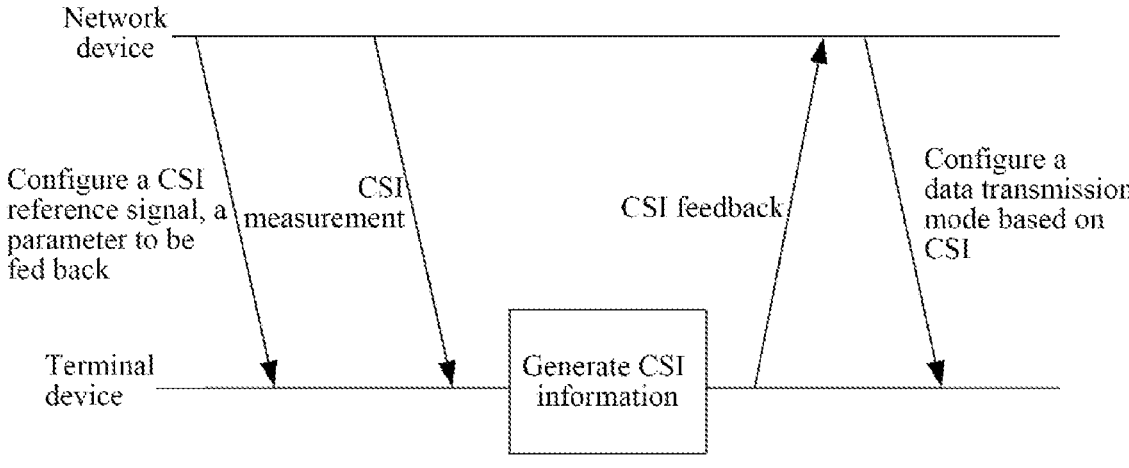
FIG. 1 is a schematic diagram of a flow of feeding back channel state indication information by a terminal device in the present disclosure.

It is very important for a terminal device to feed back the CSI to a network device in an LTE system and an NR system, and the CSI decides a performance of a Multiple-Input Multiple-Output (MIMO) transmission. Generally, the terminal device feeds back the CSI by sending CSI indication information to the network device; the CSI indication may include any one or more of a Channel Quality Indication (CQI), a Precoding Matrix Indication (PMI), or a Rank Indication (RI). A flow in which the terminal device feeds back the CSI indication information is as shown in FIG. 1. The network device configures a CSI reference signal and a parameter to be fed back for the terminal device, wherein the CSI reference signal is used for a CSI measurement, the CSI reference signal may include a Synchronization Signal Block (SSB) and/or a Channel-State Information Reference Signal (CSR-RS), and the parameter to be fed back indicates that the network device wants the terminal device to feed back which one or ones of the CQI, the PMI, or the RI. The terminal device can determine the CSI by measuring the CSI reference signal; and the terminal device feeds back CSI indication information representing the CSI to the network device. The network device can acquire the corresponding CSI according to the CSI indication information, and configure a data transmission mode for the terminal device according to the acquired CSI.

Figure 2:
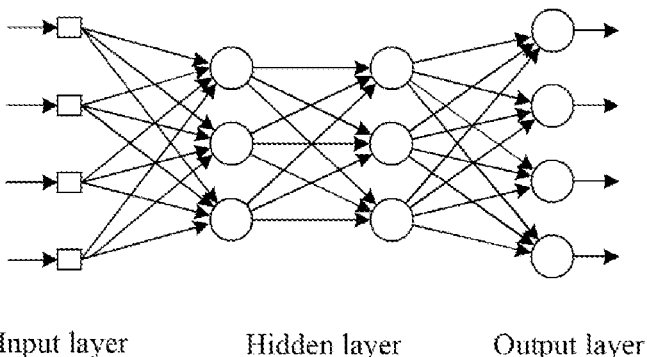
FIG. 2 is a schematic diagram of a structure of a simple neural network model of the present disclosure.

A neural network model is briefly described below again. A structure of a simple neural network model, as shown in FIG. 2, includes: an input layer, a hidden layer, and an output layer. Among them, the input layer is responsible for receiving data, the hidden layer processes the data received by the input layer, and the output layer is used for outputting a data processing result. Each node in the neural network model represents a processing unit, it may be considered that each node simulates one neuron, and multiple neurons form a layer of neural network; and one whole neural network model is constructed through multi-layer information transmission and processing.

Figure 3:
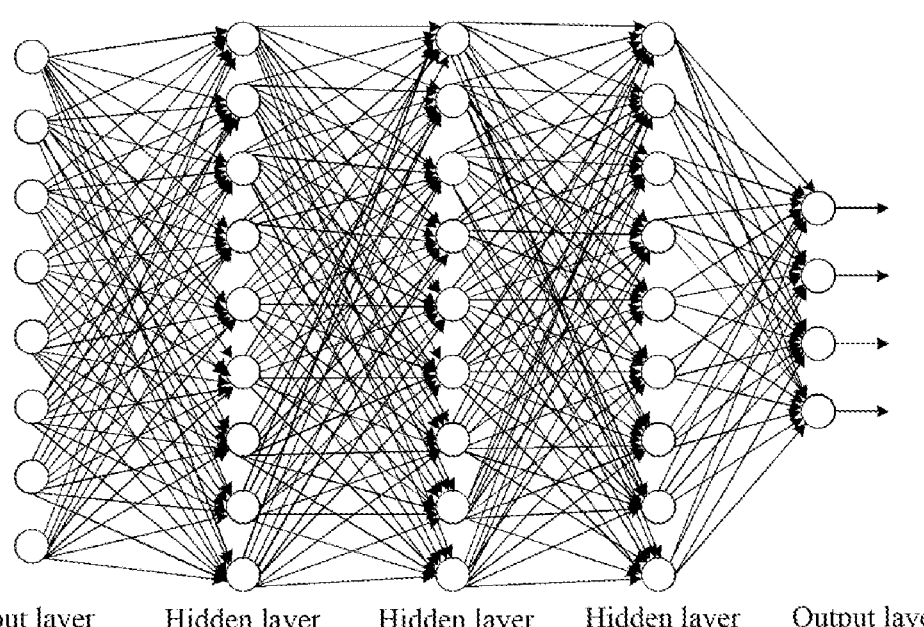
FIG. 3 is a schematic diagram of a structure of a deep neural network model of the present disclosure.

With the constantly in-depth study of the neural network model, a deep neural network model is proposed. A structure of the deep neural network model is shown in FIG. 3. Compared with a basic neural network model, the deep neural network model has more hidden layers. By training, layer by layer, the neural network model with multiple hidden layers for feature learning, learning and processing abilities of the neural network model are greatly improved. The deep neural network model has been widely used in pattern recognition, signal processing, an optimization combination, and anomaly probing, etc.

Generally, the terminal device acquires the CSI and the terminal device feeds back the CSI to the network device according to a traditional basic communication model and a preconfigured feedback parameter set and based on a mode of quantization and a codebook. However, the method for feeding back the channel state information based on the quantization and the codebook usually cannot accurately reflect actual channel state information of a current channel. Especially, with the introduction of large-scale MIMO, an upper limit of system throughput will be limited.

Based on the above problem, the present disclosure provides a method for processing channel state information. The method for processing channel state information according to an implementation of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunications system (UMTS), a worldwide interoperability for microwave access (WiMAX) communication system, wireless local area networks (WLAN), wireless fidelity (WiFi), a next generation communication system, or another communication system, etc.

Generally speaking, a traditional communication system supports a limited quantity of connections, and is also easy to implement. However, with the development of communication technology, mobile communication systems will not only support traditional communication, but also support, for example, device to device (D2D) communication, machine to machine (M2M) communication, machine type communication (MTC), or vehicle to vehicle (V2V) communication, etc., and the implementations of the present disclosure may also be applied to these communication systems.

A system architecture and a service scenario described by the implementations of the present disclosure are for explaining technical solutions of the implementations of the present disclosure more clearly, and does not constitute a limitation to the technical solutions provided by the implementations of the present disclosure. Those of ordinary skilled in the art can know that with evolving of network architectures and emerging of new service scenarios, the technical solutions provided by the implementations of the present disclosure are also applicable to similar technical problems.

The network device involved in an implementation of the present disclosure may be an ordinary base station (such as a NodeB, or an eNB, or a gNB), a new radio controller (an NR controller), a centralized unit, a new radio base station, a radio remote module, a micro base station, a relay, a distributed unit, a transmission reception point (TRP), a transmission point (TP), or any other device. An implementation of the present disclosure does not limit the specific technology and the specific device form used by the network device. For convenience of description, in all implementations of the present disclosure, the above-mentioned apparatuses for providing wireless communication functions for a terminal device are collectively referred to as a network device.

In an implementation of the present disclosure, a terminal device may be any terminal, for example, the terminal device may be a user device for machine type communication. That is to say, the terminal device may also be referred to as a user equipment (UE), a mobile station (MS), a mobile terminal, a terminal, etc., and may communicate with one or more core networks via a radio access network (RAN). For example, the terminal device may be a mobile phone (or called a "cellular" phone), or a computer with a mobile terminal, etc. For example, the terminal device may also be a portable, pocket-size, handheld, computer-built, or vehicle-mounted mobile apparatus, which exchanges speech and/or data with the wireless access network. It is not specifically limited in the implementations of the present disclosure.

Optionally, the network device and the terminal device may be deployed on land, including indoors or outdoors, hand-held or vehicle-mounted; or may be deployed on a water surface; or may be deployed on a plane, a balloon, or a satellite in the air. The implementations of the present disclosure do not limit application scenarios of the network device and the terminal device.

Optionally, communications between a network device and a terminal device and between terminal devices may be performed through a licensed spectrum, or an unlicensed spectrum, or both, at the same time. Communications between a network device and a terminal device and between terminal devices may be performed through a spectrum below 7 gigahertz (GHz), or through a spectrum above 7 GHz, or using both a spectrum below 7 GHz and a frequency spectrum above 7 Ghz at the same time. An implementation of the present disclosure does not limit spectrum resources used between a network device and a terminal device. Generally speaking, the traditional communication system supports the limited quantity of connections, and is also easy to implement. However, with the development of communication technology, the mobile communication systems will not only support traditional communication, but also support, for example, the device to device (D2D) communication, the machine to machine (M2M) communication, the machine type communication (MTC), or the vehicle to vehicle (V2V) communication, etc., and the implementations of the present disclosure may also be applied to these communication systems.

Illustratively, a communication system 100 applied in an implementation of the present disclosure is shown in FIG. 4. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, Internet/intranet access, a Web browser, a memo pad, a calendar, and/or a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

FIG. 4 illustrates one network device and two terminal devices. Optionally, the communication system 100 may include multiple network devices, and other quantity of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may also be referred to as a communication device. Taking the communication system 100 shown in FIG. 4 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, for example other network entities, such as network controllers and mobile management entities, which is not limited in the implementations of the present disclosure.

As shown in FIG. 5, an optional processing flow of a method for processing channel state information applied to a terminal device according to an implementation of the present disclosure includes following acts S201 to S203.

In the act S201, a terminal device determines a first parameter and/or a type of channel state indication information.

In some implementations, the terminal device determines the type of the channel state indication information according to first indication information sent by a network device; and then the terminal device determines the first parameter based on the type of the channel state indication information.

Optionally, the first indication information is sent by the network device to the terminal device through a broadcast message, or is sent by the network device to the terminal device through an RRC message.

Optionally, the type of the channel state indication information includes a length of the channel state indication information, or a size of a matrix representing the channel state indication information. The first indication information has a first correspondence relationship with the type of the channel state indication information, and the terminal device can determine the type of the channel state indication information corresponding to the first indication information according to the first correspondence relationship.

In a case that the type of the channel state indication information is the length of the channel state indication information, an optional schematic diagram of the first correspondence relationship is as shown in FIG. 6. Herein the first indication information is represented by M, and includes M1, M2, M3, and M4; wherein, the type of the channel state indication information corresponding to M1 is N1, which indicates that the length of the channel state indication information is 256; the type of the channel state indication information corresponding to M2 is N2, which indicates that the length of the channel state indication information is 128; the type of the channel state indication information corresponding to M3 is N3, which indicates that the length of the channel state indication information is 64; and the type of the channel state indication information corresponding to M4 is N4, which indicates that the length of the channel state indication information is 32. Optionally, a unit of a length of the channel state indication information may be a byte, or a bit, or the number of data.

In a case that the type of the channel state indication information is the size of the matrix representing the channel state indication information, and the matrix is a square matrix with L rows and L columns, another optional schematic diagram of the first correspondence relationship is shown in FIG. 7. Herein the first indication information is represented by M, including M1, M2, M3, and M4; wherein, the type of the channel state indication information corresponding to M1 is N1, which represents L=16; the type of the channel state indication information corresponding to M2 is N2, which represents L=12; the type of the channel state indication information corresponding to M3 is N3, which represents L=8; the type of the channel state indication information corresponding to M4 is N4, which represents L=4. At this time, the first indication information is used for determining the number of rows or the number of columns of the matrix.

In a case that the type of the channel state indication information is the size of the matrix representing the channel state indication information, and the number of rows of the matrix is L and the number of columns of the matrix is R, another optional schematic diagram of the first correspondence relationship is shown in FIG. 8. Herein the first indication information is represented by M, including M1, M2, M3, and M4; wherein, the type of the channel state indication information corresponding to M1 is N1, which represents L=32, and R=16; the type of the channel state indication information corresponding to M2 is N2, which represents L=16, and R=8; the type of the channel state indication information corresponding to M3 is N3, which represents L=8, and R=4; the type of the channel state indication information corresponding to M4 is N4, which represents L=4, and R=2. At this time, the first indication information is used for determining the number of rows and the number of columns of the matrix.

For the first correspondence relationship described in FIGS. 6 to 8, in some optional implementations, the first indication information is 2 bits, M1 is 00, M2 is 01, M3 is 10, and M4 is 11. The first correspondence relationship may be sent by the network device to the terminal device through an RRC message; or the first correspondence relationship may be sent by the network device to the terminal device through a broadcast message; or the first correspondence relationship may be preset, e.g., the first correspondence relationship is preset by protocol.

After the terminal device determines the type of the channel state indication information based on any one correspondence relationship shown in FIGS. 6 to 8, the terminal device determines the first parameter corresponding to the type of the channel state indication information based on a mapping relationship between the first parameter and the type of the channel state indication information. Herein, the mapping relationship between the first parameter and the type of the channel state indication information is sent by the network device to the terminal device through the RRC message; or, the mapping relationship between the first parameter and the type of the channel state indication information is sent by the network device to the terminal device through the broadcast message; or, the mapping relationship between the first parameter and the type of the channel state indication information is preset.

In the mapping relationship between the first parameter and the type of the channel state indication information, every type of the channel state indication information corresponds to one set of first parameters. Multiple sets of first parameters are sent by the network device to the terminal device through the RRC message; or, multiple sets of first parameters are sent by the network device to the terminal device through the broadcast message; or, multiple sets of first parameters are preset. The mapping relationship between the first parameter and the type of the channel state indication information may be sent by the network device to the terminal device through the RRC message; or, the mapping relationship between the first parameter and the type of the channel state indication information is sent by the network device to the terminal device through the broadcast message; or, the mapping relationship between the first parameter and the type of the channel state indication information is preset.

In some other implementations, the terminal device determines one set of first parameters from at least two sets of first parameters according to the first indication information sent by the network device; and then the terminal device determines the type of the channel state indication information based on the determined first parameter.

Optionally, the first indication information is sent by the network device to the terminal device through the broadcast message, or by the network device to the terminal device through the RRC message.

Optionally, the first indication information has a second correspondence relationship with the first parameter, and the terminal device can determine the first parameter corresponding to the first indication information according to the second correspondence relationship.

An optional schematic diagram of the second correspondence relationship is as shown in FIG. 9, the first indication information is represented by M, and the first indication information includes M1, M2, M3, and M4; herein, M1 corresponds to a first set of first parameters N1; M2 corresponds to a second set of first parameters N2; M3 corresponds to a third set of first parameters N3; and M4 corresponds to a fourth set of first parameters N4.

Optionally, the first indication information is 2 bits, M1 is 00, M2 is 01, M3 is 10, and M4 is 11. The second correspondence relationship may be sent by the network device to the terminal device through the RRC message; or the second correspondence relationship may be sent by the network device to the terminal device through the broadcast message; or the second correspondence relationship may be preset, for example, the second correspondence relationship is preset by protocol.

After the terminal device determines the first parameter based on the first correspondence relationship, the terminal determines the type of the channel state indication information corresponding to the first parameter based on the mapping relationship between the first parameter and the type of the channel state indication information. The mapping relationship between the first parameter and the type of the channel state indication information is sent by the network device to the terminal device through an RRC message. Or, the mapping relationship between the first parameter and the type of the channel state indication information is sent by the network device to the terminal device through a broadcast message. Or, the mapping relationship between the first parameter and the type of the channel state indication information is preset.

In the mapping relationship between the first parameter and the type of the channel state indication information, every type of the channel state indication information corresponds to one set of first parameters. Multiple sets of first parameters are sent by the network device to the terminal device through the RRC message; or, multiple sets of first parameters are sent by the network device to the terminal device through the broadcast message; or, multiple sets of first parameters are preset. The mapping relationship between the first parameter and the type of the channel state indication information may be sent by the network device to the terminal device through the RRC message; or, the mapping relationship between the first parameter and the type of the channel state indication information is sent by the network device to the terminal device through the broadcast message; or, the mapping relationship between the first parameter and the type of the channel state indication information is preset.

In yet some other implementations, the terminal device determines one set of first parameters from at least two sets of first parameters based on the first indication information sent by the network device; and/or the terminal device determines the type of the channel state indication information based on second indication information sent by the network device. Herein, the first indication information and the second indication information may be carried in a same piece of signaling or different pieces of signaling.

In an optional scenario, with a unique type of the channel state indication information, the terminal device only needs to determine the first parameter. A processing process for the terminal device to determine one set of first parameters from at least two sets of first parameters according to receiving first indication information sent by the network device is same as the processing process in the above implementation, and will not be repeated here.

In an optional scenario, with a unique first parameter, the terminal device only needs to determine the type of the channel state indication information. A processing process for the terminal device to determine the type of the channel state indication information according to the received first indication information sent by the network device is same as the above processing process, and will not be repeated here.

In an optional scenario, the type of the channel state indication information and the first parameter are not unique. The terminal device needs to determine one set of first parameters from at least two sets of first parameters based on the first indication information sent by network device, and determine the channel state indication information based on the second indication information sent by the network device. Optionally, a content in the second indication information is channel state indication information, and the terminal device can directly determine the channel state indication information according to receiving the second indication information. Or, the second indication information has a third correspondence relationship with the channel state indication information, and the terminal device can determine the channel state indication information corresponding to the second indication information according to the third correspondence relationship. The third correspondence relationship is sent by the network device to the terminal device through the RRC message; or, the third correspondence relationship is sent by the network device to the terminal device through the broadcast message; or, the third correspondence relationship is preset. A process for the terminal device to determine the first parameter and the type of the channel state indication information is same as the above processing process, and will not be repeated here.

In the act S202, the terminal device generates the channel state indication information based on the first parameter and/or the type of the channel state indication information.

In some implementations, the terminal device generates the channel state indication information based on a coding model. Optionally, the coding model is a coding neural network model.

Herein, the coding model is constructed by the first parameter, and the type of the channel state indication information corresponding to the channel state indication information is same as the type of the channel state indication information determined by the terminal device. For example, the terminal device determines that the type of the channel state indication information is that a length of the channel state indication information is 128, then the length of the channel state indication information generated by the terminal device is 128.

In some implementations, the method further includes an act S203, in the act S203, the terminal device sends first indication information to the network device.

Herein, the third indication information is used for the network device to determine the channel state information. Optionally, the network device decodes the channel state indication information based on a decoding model corresponding to the coding model, to obtain the channel state information.

As shown in FIG. 10, an optional processing flow of a method for processing channel state information applied to the network device according to an implementation of the present disclosure includes a following act S301.

In the act S301, a network device sends information to a terminal device, wherein the information is used for the terminal device to acquire a first parameter and/or a type of channel state indication information.

In some implementations, the network device sends first indication information to the terminal device, wherein the first indication information is used for the terminal device to determine the type of the channel state indication information, and the type of the channel state indication information is used for the terminal device to determine the first parameter. Herein, the type of the channel state indication information includes: a length of the channel state indication information, or a size of a matrix representing the channel state indication information.

The first indication information has a first correspondence relationship with the type of the channel state indication information. The first correspondence relationship is determined by the network device; or, the first correspondence relationship is preset. A description for the first correspondence relationship is same as the description for the first correspondence relationship in the above act S201, and will not be repeated here.

Herein, the first parameter is determined by the terminal device based on a mapping relationship between the first parameter and the type of the channel state indication information. A description for the mapping relationship between the first parameter and the type of the channel state indication information is same as the description for the mapping relationship between the first parameter and the type of the channel state indication information in the above act S201, and will not be repeated here.

In some other implementations, the network device sends the first indication information to the terminal device, wherein the first indication information is used for the terminal device to determine one set of first parameters from at least two sets of first parameters, and the determined first parameter is used for the terminal device to determine the type of the channel state indication information.

The first indication information has a second correspondence relationship with the first parameter. The second correspondence relationship is determined by the network device, or the second correspondence relationship is preset. The type of the channel state indication information is determined by the terminal device based on the mapping relationship between the first parameter and the type of the channel state indication information. A description for the second correspondence relationship and the mapping relationship between the first parameter and the type of the channel state indication information is same as the description for the second correspondence relationship and the mapping relationship between the first parameter and the type of the channel state indication information in the above act S201, and will not be repeated here.

In yet some other implementations, the network device sends first indication information to the terminal device, wherein the first indication information is used for the terminal device to determine one set of first parameters from at least two sets of first parameters; and/or the network device sends second indication information to the terminal device, wherein the second indication information is used for the terminal device to determine the type of the channel state indication information.

The first indication information has a second correspondence relationship with the first parameter, wherein the second correspondence relationship is determined by the network device, or the second correspondence relationship is preset. The second indication information has a third correspondence relationship with the channel state indication information, wherein the third correspondence relationship is determined by the network device, or the third correspondence relationship is preset. Herein, the first indication information and the second indication information may be in a same piece of signaling or different pieces of signaling.

In some implementations, the first indication information is sent through the broadcast message or the RRC message; and the second indication information is sent through the broadcast message or the RRC message.

In some implementations, the method further includes acts S302 and S303.

In the act S302, the network device receives third indication information sent by the terminal device, and determines the channel state indication information base on the third indication information.

In some implementations, the network device determines the channel state indication information according to an indication of the third indication information.

In the act S303, the network device determines channel state information based on the channel state indication information.

In some implementations, by using the first parameter and/or a second parameter corresponding to the type of the channel state indication information, the network device decodes the channel state indication information, to determine the channel state information.

Herein, the first parameter and/or the correspondence relationship between the type of the channel state indication information and the second parameter are determined by the network device; or, the first parameter and/or the correspondence relationship between the type of the channel state indication information and the second parameter are preset.

The second parameter is used for constructing a decoding model used by the network device to determine the channel state information. Optionally, the decoding model is a decoding neural network model.

It should be understood that in various implementations of the present disclosure, sequence numbers of the various processes do not imply an order of execution of the various processes, the order of execution of the various processes should be determined by their functions and internal logics, and should not constitute any limitation on implementation processes of the implementations of the present disclosure.

As an example, the terminal device determines the channel state indication information by using the coding neural network model and the network device determines the channel state information by using the decoding neural network model, the network architecture of the method for processing channel state information provided by an implementation of the present disclosure will be explained below. As shown in FIG. 11, a terminal device takes the channel state information as an input of the coding neural network model, and the channel state indication information outputted by the coding neural network model as a feedback vector. A network device takes the feedback vector as an input of the decoding neural network model, and the decoding neural network model outputs the channel state information.

Through training the coding neural network model and the decoding neural network model, it may be determined that a size of the channel state indication information fed back by the terminal device to the network device has an association relationship with an error between the channel state information determined by the terminal device and the channel state information determined by network device through decoding. The larger the channel state indication information fed back by the terminal device, the smaller the error between the channel state information determined by the terminal device and the channel state information determined by the network device through decoding. For example, the channel state indication information fed back by the terminal device is 512, and the error between the channel state information determined by the terminal device and the channel state information determined by the network device through decoding is extremely small; or the channel state indication information fed back by the terminal device is 64, and the error between the channel state information determined by the terminal device and the channel state information determined by the network device through decoding is relatively small.

Optionally, in an implementation of the present disclosure, the coding neural network model and the decoding neural network model are self-coding neural network models, the channel state information is coded by using the coding neural network model, the output data of the coding neural network model is used as an input of the decoding neural network model, and the input data is decoded by using the decoding neural network model, thus the channel state information can be accurately restored, and an error between the channel state information of the input data of the coding neural network model and the channel state information outputted by the decoding neural network model can be reduced.

Based on the network architecture shown in FIG. 11, as shown in FIG. 12, a processing flow of the method for processing channel state information applied to a communication system provided by an implementation of the present disclosure includes: a network device configures a CSI reference signal for a terminal device; and the terminal device measures CSI based on a CSI reference channel to obtain the CSI. The terminal device takes the CSI as an input of the coding neural network model, and the coding neural network model outputs channel state indication information; that is, the terminal device generates the channel state indication information based on the CSI by using an AI algorithm. The terminal device sends the channel state indication information to the network device, and the network device takes the channel state indication information as the input of the decoding neural network model, and the decoding neural network model outputs the CSI; that is, the network device restores channel state information by using the AI algorithm based on the channel state indication information. The network device configures a data transmission mode for the terminal device according to the channel state information.

It should be noted that the channel state information related to the implementations of the present disclosure is not limited to an SINR, a Signal to Noise Ratio (SNR), a Block Error Rate (BLER), or a Reference Signal Receiving Quality (RSRQ), and the channel state information related to the implementations of the present disclosure includes any parameter that can represent a channel quality state.

Figure 13:
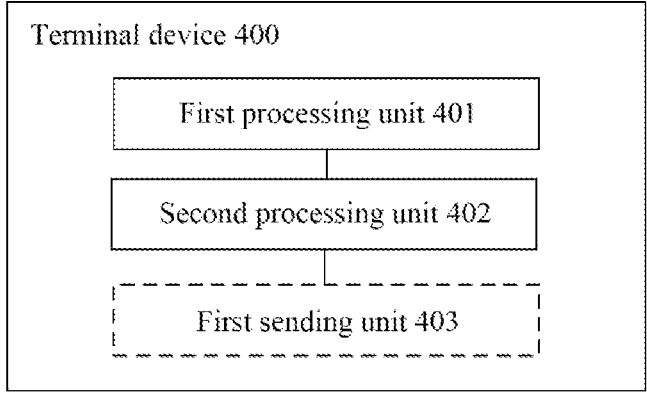
FIG. 13 is a schematic diagram of a composition structure of a terminal device according to an implementation of the present disclosure.

In order to realize the above method for processing channel state information, an implementation of the present disclosure provides a terminal device. As shown in FIG. 13, a composition structure of the terminal device 400 includes: a first processing unit 401, configured to determine a first parameter and/or a type of channel state indication information; and a second processing unit 402, configured to generate the channel state indication information based on the first parameter and/or the type of the channel state indication information, wherein the channel state indication information is used for the terminal device to indicate channel state information to a network device.

In some implementations, the first processing unit 401 is configured to determine the type of the channel state indication information based on first indication information sent by the network device.

In some implementations, the first processing unit 401 is configured to determine the first parameter based on the type of the channel state indication information.

In some implementations, the first processing unit 401 is configured to determine the first parameter corresponding to the type of the channel state indication information based on a mapping relationship between the first parameter and the type of the channel state indication information.

In some implementations, the first indication information has a first correspondence relationship with the type of the channel state indication information. The first correspondence relationship is sent by the network device to the terminal device through an RRC message; or, the first correspondence relationship is sent by the network device to the terminal device through a broadcast message; or, the first correspondence relationship is preset.

In some implementations, the first processing unit 401 is configured to determine one set of first parameters from at least two sets of first parameters based on first indication information sent by the network device.

In some implementations, the first processing unit 401 is configured to determine the type of the channel state indication information based on the determined first parameter.

In some implementations, the first processing unit 401 is configured to determine the type of the channel state indication information corresponding to the determined first parameter, based on the mapping relationship between the first parameter and the type of the channel state indication information.

In some implementations, the first processing unit 401 is configured to determine one set of first parameters from at least two sets of first parameters, based on the first indication information sent by the network device; and/or, the first processing unit is configured to determine the type of the channel state indication information based on second indication information sent by the network device.

In some implementations, the first indication information has a second correspondence relationship with the first parameter; the second correspondence relationship is sent by the network device to the terminal device through the RRC message; or, the second correspondence relationship is sent by the network device to the terminal device through the broadcast message; or, the second correspondence relationship is preset.

In some implementations, the second indication information has a third correspondence relationship with the channel state indication information; the third correspondence relationship is sent by the network device to the terminal device through the RRC message; or, the third correspondence relationship is sent by the network device to the terminal device through the broadcast message; or, the third correspondence relationship is preset.

In some implementations, the mapping relationship between the first parameter and the type of the channel state indication information is sent by the network device to the terminal device through the RRC message; or, the mapping relationship between the first parameter and the type of the channel state indication information is sent by the network device to the terminal device through the broadcast message; or, the mapping relationship between the first parameter and the type of the channel state indication information is preset.

In some implementations, the first indication information is sent through the broadcast message, or through an RRC message.

In some implementations, the type of the channel state indication information includes a length of the channel state indication information, or a size of a matrix representing the channel state indication information.

In some implementations, if the matrix representing the channel state indication information is a square matrix, the size of the matrix representing the channel state indication information includes the number of rows or the number of columns of the matrix; or, if the matrix representing the channel state indication information is not a square matrix, the size of the matrix representing the channel state indication information includes the number of rows and the number of columns of the matrix.

In some implementations, the terminal device 400 further includes: a first sending unit 403, configured to send third indication information to the network device, wherein the third indication information is used for the network device to determine the channel state information.

In some implementations, the first parameter is one of at least two sets of first parameters; the at least two sets of first parameters are sent by the network device to the terminal device through the RRC message; or, the at least two sets of first parameters are sent by the network device to the terminal device through the broadcast message; or, the at least two sets of first parameters are preset.

In some implementations, the second processing unit 402 is configured to generate the channel state indication information based on a coding model, wherein the coding model is constructed by the first parameter.

In some implementations, the coding model is a coding neural network model.

Figure 14:
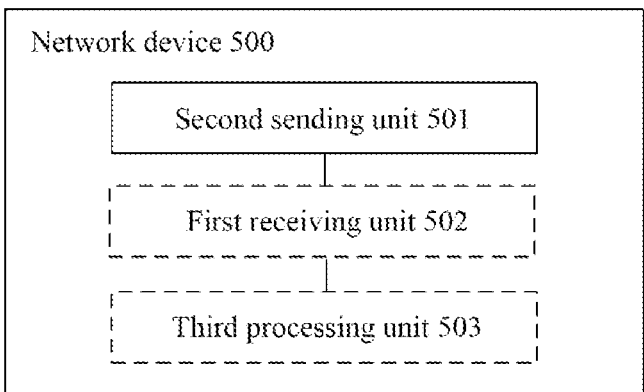
FIG. 14 is a schematic diagram of a composition structure of a network device according to an implementation of the present disclosure.

In order to realize the above method for processing channel state information, an implementation of the present disclosure provides a network device. As shown in FIG. 14, a composition structure of a network device 500 includes: a second sending unit 501, configured to send information to a terminal device; the information is used for the terminal device to acquire a first parameter and/or a type of channel state indication information, wherein the first parameter and/or the type of the channel state indication information is used for the terminal device to generate the channel state indication information.

In some implementations, the second sending unit 501 is configured to send first indication information to the terminal device, wherein the first indication information is used for the terminal device to determine the type of the channel state indication information, and the type of the channel state indication information is used for the terminal device to determine the first parameter.

In some implementations, the first parameter is determined by the terminal device based on a mapping relationship between the first parameter and the type of the channel state indication information.

In some implementations, the first indication information has a first correspondence relationship with the type of the channel state indication information; the first correspondence relationship is determined by the network device; or, the first correspondence relationship is preset.

In some implementations, the second sending unit 501 is configured to send the first indication information to the terminal device, wherein the first indication information is used for the terminal device to determine one set of first parameters from at least two sets of first parameters, and the determined first parameter is used for the terminal device to determine the type of the channel state indication information.

In some implementations, the type of the channel state indication information is determined by the terminal device based on the mapping relationship between the first parameter and the type of the channel state indication information.

In some implementations, the second sending unit 501 is configured to send the first indication information to the terminal device, wherein the first indication information is used for the terminal device to determine one set of first parameters from at least two sets of first parameters; and/or, the second sending unit 501 is configured to send second indication information to the terminal device, wherein the second indication information is used for the terminal device to determine the type of the channel state indication information.

In some implementations, the first indication information has a second correspondence relationship with the first parameter; the second correspondence relationship is determined by the network device; or, the second correspondence relationship is preset.

In some implementations, the second indication information has a third correspondence relationship with the channel state indication information; the third correspondence relationship is determined by the network device; or, the third correspondence relationship is preset.

In some implementations, the mapping relationship between the first parameter and the type of the channel state indication information is sent by the network device to the terminal device through the RRC message; or, the mapping relationship between the first parameter and the type of the channel state indication information is sent by the network device to the terminal device through the broadcast message;

or, the mapping relationship between the first parameter and the type of the channel state indication information is preset.

In some implementations, the first indication information is sent through the broadcast message, or through an RRC message.

In some implementations, the type of the channel state indication information includes: a length of the channel state indication information, or a size of a matrix representing the channel state indication information.

In some implementations, if the matrix representing the channel state indication information is a square matrix, the size of the matrix representing the channel state indication information includes the number of rows or the number of columns of the matrix; or, if the matrix representing the channel state indication information is not a square matrix, the size of the matrix representing the channel state indication information includes the number of rows and the number of columns of the matrix.

In some implementations, the network device further includes: a first receiving unit 502, configured to receive third indication information sent by the terminal device, and determine the channel state indication information based on the third indication information.

In some implementations, the network device further includes: a third processing unit 503, configured to determine channel state information based on the channel state indication information.

In some implementations, the third processing unit 503 is configured to decode, by using the first parameter and/or a second parameter corresponding to the type of the channel state indication information, the channel state indication information, and determine the channel state information.

In some implementations, the second parameter is used for constructing a decoding model used by the network device to determine the channel state information.

In some implementations, the decoding model is a decoding neural network model.

In some implementations, the first parameter and/or the correspondence relationship between the type of the channel state indication information and the second parameter is determined by the network device; or, the first parameter and/or the correspondence relationship between the type of the channel state indication information and the second parameter is preset.

In some implementations, the first parameter is one of at least two sets of first parameters; the at least two sets of first parameters are sent by the network device to the terminal device through a Radio Resource Control (RRC) message; or, the at least two sets of first parameters are sent by the network device to the terminal device through the broadcast message; or, the at least two sets of first parameters are preset.

An implementation of the present disclosure further provides a terminal device, including a processor and a memory configured to store a computer program which is capable of being run on the processor, wherein the processor is configured to execute acts of the above method for processing channel state information performed by the terminal device when running the computer program.

An implementation of the present disclosure further provides a network device, including a processor and a memory configured to store a computer program which is capable of being run on the processor, wherein the processor is configured to execute acts of the above method for processing channel state information performed by the network device when running the computer program.

Figure 15:
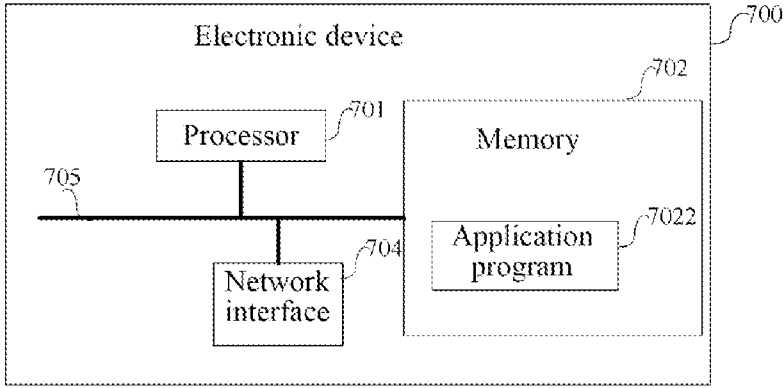
FIG. 15 is a schematic diagram of a hardware composition structure of an electronic device according to an implementation of the present disclosure.

FIG. 15 is a schematic diagram of a hardware composition structure of an electronic device (a terminal device or a network device) of an implementation of the present disclosure. The electronic device 700 includes: at least one processor 701, a memory 702, and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity, all kinds of buses are uniformly referred to as a bus system 705 in the FIG. 15.

It can be understood that the memory 702 may be a volatile memory or a non-volatile memory, or may include both the volatile memory and the non-volatile memory. Herein, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM); and the magnetic surface memory may be a magnetic disk memory or a magnetic tape memory. The transitory memory may be a Random Access Memory (RAM) which serves as an external cache. By way of illustrative but not restrictive explanation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in an implementation of the present disclosure is intended to include, but is not limited to, these and any other suitable types of memories.

The memory 702 in an implementation of the present disclosure is configured to store various types of data to support an operation of the electronic device 700. Examples of such data include any computer program for operating on the electronic device 700, such as an application program 7022. A program for implementing the method of an implementation of the present disclosure may be contained in the application program 7022.

Methods disclosed in above implementations of the present disclosure may be applied to the processor 701, or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above processor 701 may be a general purpose processor, a Digital Signal Processor (DSP), or other programmable logic devices, a discrete gate or transistor logic device, or a discrete hardware component, etc. The processor 701 may implement or execute various methods, acts, and logical block diagrams disclosed in implementations of the present disclosure. The general purpose processor may be a microprocessor or any conventional processor or the like. The acts of the methods disclosed in implementations of the present disclosure may be directly embodied to be executed by a hardware decoding processor, or may be performed by a combination of hardware in the decoding processor and software modules. The software module may be located in a storage medium, and the storage medium is located in the memory 702. The processor 701 reads information in the memory 702 and accomplishes the acts of the aforementioned methods in combination with hardware thereof.

In an exemplary implementation, an electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An implementation of the present disclosure further provides a storage medium configured to store a computer program.

Optionally, the storage medium may be applied to the terminal device in an implementation of the present disclosure, and the computer program enables the computer to execute corresponding flow in each method in an implementation of the present disclosure, which will not be repeated here for brevity.

Optionally, the storage medium may be applied to the network device in the implementations of the present disclosure, and the computer program causes the computer to perform corresponding flows in various methods in the implementations of the present disclosure, which will not be repeated here for brevity.

The present disclosure is described with reference to flowcharts and/or block diagrams of the methods, the devices (systems), and computer program products of the implementations of the present disclosure. It should be understood that each flow and/or block in the flowchart and/or block diagram, and combinations of flows and/or blocks in the flowchart and/or block diagram can be implemented by computer program instructions. These computer program instructions may be provided to a general purpose computer, a special purpose computer, an embedded processor or a processor of other programmable data processing device to produce a machine, such that the instructions which are executed by the computer or the processor of other programmable data processing device produce apparatus for implementing the functions specified in one or more flows of the flowchart and/or one or more blocks of the block diagram.

These computer program instructions may also be stored in a computer-readable memory that can direct a computer or other programmable data processing device to operate in a specific manner, such that the instructions stored in the computer-readable memory produce an article of manufacture including instruction apparatus that implement the functions specified in one or more flows of the flowchart and/or one or more blocks of the block diagram.

These computer program instructions may also be loaded onto a computer or other programmable data processing device, such that a series of operational acts are performed on the computer or other programmable device to produce a computer-implemented processing, thereby the instructions which are executed on the computer or other programmable device are used for implementing acts of the functions specified in one or more flows of the flowchart and/or one or more blocks of the block diagram.

The above description is only the preferred implementations of the present disclosure, and is not intended to limit the protection scope of the present disclosure. Any modification, equivalent substitution, improvement, or the like, made within the spirit and the principle of the present disclosure shall be included within the protection scope of the present disclosure.

What is claimed is:

1. A method for processing channel state information, comprising:

determining, by a terminal device, a first parameter and a type of channel state indication information; and generating, by the terminal device, channel state indication information based on the first parameter and the type of the channel state indication information, wherein the channel state indication information is used for the terminal device to indicate channel state information to a network device; wherein determining, by the terminal device, the first parameter and/or the type of the channel state indication information comprises:

determining, by the terminal device, one set of first parameters from at least two sets of first parameters based on first indication information sent by the network device; and determining, by the terminal device, the type of the channel state indication information based on second indication information sent by the network device; wherein generating the channel state indication information comprises:

generating the channel state indication information based on a coding model, wherein the coding model is constructed by the first parameter, the coding model is a coding neural network model, and the first indication information has a second correspondence relationship with the first parameter;

the second correspondence relationship is sent by the network device to the terminal device through an RRC message; or the second correspondence relationship is sent by the network device to the terminal device through a broadcast message; or the second correspondence relationship is preset;

wherein the second indication information has a third correspondence relationship with the channel state indication information;

the third correspondence relationship is sent by the network device to the terminal device through an RRC message; or the third correspondence relationship is sent by the network device to the terminal device through a broadcast message; or the third correspondence relationship is preset;

wherein the type of the channel state indication information comprises:

a length of the channel state indication information, or a size of a matrix representing the channel state indication information.

2. A terminal device, comprising: a processor, a memory for storing a computer program that is executable on the processor, and a network interface;

wherein the processor is configured to:

determine a first parameter and a type of channel state indication information; and generate channel state indication information based on the first parameter and the type of the channel state indication information, wherein the channel state indication information is used for the terminal device to indicate channel state information to a network device; wherein the processor is configured to determine one set of first parameters from at least two sets of first parameters based on first indication information sent by the network device;

and, the processor is configured to determine the type of the channel state indication information based on second indication information sent by the network device; wherein the processor is configured to generate the channel state indication information based on a coding model, wherein the coding model is constructed by the first parameter, wherein the coding model is a coding neural network model, and the first indication information has a second correspondence relationship with the first parameter;

the second correspondence relationship is sent by the network device to the terminal device through an RRC message; or the second correspondence relationship is sent by the network device to the terminal device through a broadcast message; or the second correspondence relationship is preset;

wherein the second indication information has a third correspondence relationship with the channel state indication information;

the third correspondence relationship is sent by the network device to the terminal device through an RRC message; or the third correspondence relationship is sent by the network device to the terminal device through a broadcast message; or the third correspondence relationship is preset;

wherein the type of the channel state indication information comprises:

a length of the channel state indication information, or a size of a matrix representing the channel state indication information.

3. The terminal device of claim 2, wherein the processor is configured to determine the type of the channel state indication information further based on the first indication information sent by the network device.

4. The terminal device of claim 3, wherein the processor is configured to determine the first parameter based on the type of the channel state indication information.

5. The terminal device of claim 4, wherein the processor is configured to determine the first parameter corresponding to the type of the channel state indication information based on a mapping relationship between the first parameter and the type of the channel state indication information.

6. The terminal device of claim 5, wherein the mapping relationship between the first parameter and the type of the channel state indication information is sent by the network device to the terminal device through an RRC message;

or, the mapping relationship between the first parameter and the type of the channel state indication information is sent by the network device to the terminal device through a broadcast message;

or, the mapping relationship between the first parameter and the type of the channel state indication information is preset.

7. The terminal device of claim 3, wherein the first indication information has a first correspondence relationship with the type of the channel state indication information;

the first correspondence relationship is sent by the network device to the terminal device through a Radio Resource Control (RRC) message;

or, the first correspondence relationship is sent by the network device to the terminal device through a broadcast message;

or, the first correspondence relationship is preset.

8. The terminal device of claim 3, wherein the first indication information is sent through a broadcast message, or through an RRC message.

9. The terminal device of claim 2, wherein if the matrix representing the channel state indication information is a square matrix, the size of the matrix representing the channel state indication information comprises a number of rows or a number of columns of the matrix;

or, if the matrix representing the channel state indication information is not a square matrix, the size of the matrix representing the channel state indication information comprises a number of rows and a number of columns of the matrix.

10. The terminal device of claim 2, wherein the processor is configured to send third indication information to the network device through the network interface, wherein the third indication information is used for the network device to determine the channel state information.

11. The terminal device of claim 2, wherein the first parameter is one of the at least two sets of first parameters;

the at least two sets of first parameters are sent by the network device to the terminal device through an RRC message; or, the at least two sets of first parameters are sent by the network device to the terminal device through a broadcast message; or, the at least two sets of first parameters are preset.

12. A network device, comprising: a processor, a memory for storing a computer program that is executable on the processor, and a network interface;

wherein the processor is configured to send information to a terminal device through the network interface; wherein the information is used for the terminal device to acquire a first parameter and a type of channel state indication information, and the first parameter and the type of the channel state indication information is used for the terminal device to generate channel state indication information; wherein the processor is configured to send first indication information to the terminal device, wherein the first indication information is used for the terminal device to determine one set of first parameters from at least two sets of first parameters; and the processor is configured to send second indication information to the terminal device, wherein the second indication information is used for the terminal device to determine the type of the channel state indication information; wherein the processor is further configured to determine the channel state information based on the channel state indication information; wherein the processor is further configured to decode the channel state indication information by using the first parameter and a second parameter corresponding to the type of the channel state indication information, and determine the channel state information; wherein the second parameter is used for constructing a decoding model used by the network device to determine the channel state information; wherein the decoding model is a decoding neural network model, and the first indication information has a second correspondence relationship with the first parameter;

the second correspondence relationship is sent by the network device to the terminal device through an RRC message; or the second correspondence relationship is sent by the network device to the terminal device through a broadcast message; or the second correspondence relationship is preset;

wherein the second indication information has a third correspondence relationship with the channel state indication information;

the third correspondence relationship is sent by the network device to the terminal device through an RRC message; or the third correspondence relationship is sent by the network device to the terminal device through a broadcast message; or the third correspondence relationship is preset wherein the type of the channel state indication information comprises:

a length of the channel state indication information, or a size of a matrix representing the channel state indication information.

* * * * *